United States Patent
Bhaisora et al.

(10) Patent No.: US 8,240,993 B2
(45) Date of Patent: Aug. 14, 2012

(54) SYSTEM AND METHOD OF MANIPULATING A BOUNDARY LAYER ACROSS A ROTOR BLADE OF A WIND TURBINE

(75) Inventors: Shailesh Singh Bhaisora, Bangalore (IN); Narasimha Shastri, Cambridge (GB); Anurag Gupta, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/984,222

(22) Filed: Jan. 4, 2011

(65) Prior Publication Data
US 2011/0206507 A1    Aug. 25, 2011

(51) Int. Cl.
*F03D 1/06* (2006.01)
(52) U.S. Cl. ........................ 416/91; 416/231 R
(58) Field of Classification Search .............. 416/231 R, 416/231 A, 231 B, 91, 90 A, 90 R; 415/914
See application file for complete search history.

(56) References Cited

U.S. PATENT DOCUMENTS

| | | | | |
|---|---|---|---|---|
| 3,144,220 | A * | 8/1964 | Kittelson | ................. 244/203 |
| 5,957,413 | A | 9/1999 | Glezer et al. | |
| 5,961,080 | A | 10/1999 | Sinha | |
| 6,644,598 | B2 | 11/2003 | Glezer et al. | |
| 6,840,741 | B1 | 1/2005 | Wake et al. | |
| 7,354,247 | B2 * | 4/2008 | Bonnet | ................. 416/90 R |
| 7,387,491 | B2 | 6/2008 | Saddoughi et al. | |
| 7,435,057 | B2 * | 10/2008 | Parera | ................. 416/231 R |
| 7,600,963 | B2 | 10/2009 | Miller | |
| 7,828,523 | B2 | 11/2010 | Bonnet | |
| 2005/0207895 | A1 * | 9/2005 | Dunn | ................. 416/231 R |

(Continued)

FOREIGN PATENT DOCUMENTS

DE    4014685 A   * 12/1991

(Continued)

OTHER PUBLICATIONS

"Combining thick airfoils and high aerodynamic performance by means of Boundary Layer Control," Actiflow BV, Zinkstraat 22, 4823 AD Breda, The Netherlands, 2009.

(Continued)

*Primary Examiner* — Richard Edgar
(74) *Attorney, Agent, or Firm* — Ann M. Agosti

(57) ABSTRACT

An air distribution system for manipulating a boundary layer of air across a wind turbine rotor blade. The wind turbine rotor blade includes at least one sidewall that defines a cavity therein. The sidewall extends between a leading edge and an axially-spaced trailing edge, and defines a chordwise axis between the leading edge and the trailing edge. The air distribution system includes a plurality of bleed flow assemblies that are positioned within the rotor blade and are configured to discharge air into the boundary layer to reduce a separation of the boundary layer from the rotor blade. Each bleed flow assembly of the plurality of bleed flow assemblies includes a bleed flow conduit that is coupled to an inner surface of the sidewall and is oriented with respect to the chordwise axis between the leading edge and the trailing edge. The bleed flow conduit is configured to channel air through the rotor blade. An inlet aperture is defined through the bleed flow conduit and through the sidewall to channel air into the bleed flow conduit. An outlet aperture is defined through the bleed flow conduit and through the sidewall to discharge air from the bleed flow conduit and into the boundary layer.

15 Claims, 6 Drawing Sheets

U.S. PATENT DOCUMENTS

| | | |
|---|---|---|
| 2008/0317598 A1 | 12/2008 | Barbu et al. |
| 2010/0104436 A1 | 4/2010 | Herr et al. |
| 2010/0143118 A1 | 6/2010 | Eggleston et al. |

FOREIGN PATENT DOCUMENTS

| | | | |
|---|---|---|---|
| GB | 2246398 A | * | 1/1992 |
| JP | 02112700 A | * | 4/1990 |
| JP | 2008196501 A | * | 8/2008 |

OTHER PUBLICATIONS

Vaclav Tesar et al., "Lift and separation control on wind turbine blades by vortices having streamwise oriented axes," Institute of Thermomechanics AS CR, v.v.i., Prague, Oct. 22-24, 2008.

* cited by examiner

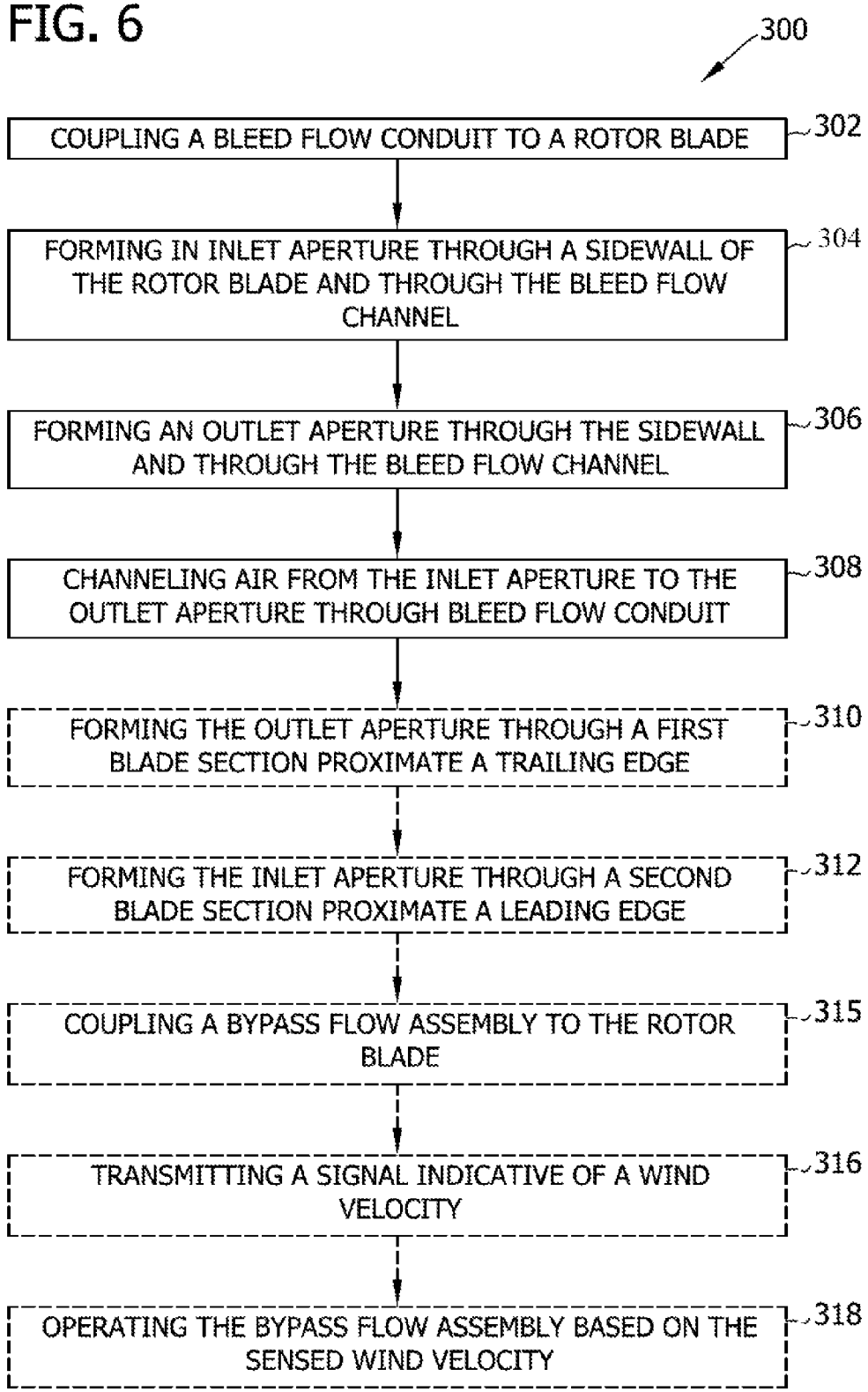

US 8,240,993 B2

SYSTEM AND METHOD OF MANIPULATING A BOUNDARY LAYER ACROSS A ROTOR BLADE OF A WIND TURBINE

BACKGROUND OF THE INVENTION

The subject matter described herein relates generally to wind turbines and, more particularly, to methods and systems for manipulating a boundary layer across a rotor blade of a wind turbine.

At least some known wind turbines include a nacelle fixed atop a tower, wherein the nacelle includes a rotor coupled to a generator through a shaft. In known rotor assemblies, a plurality of blades extend from the rotor. The blades are oriented such that wind passing over the blades turns the rotor and rotates the shaft, thereby driving the generator to generate electricity. As wind flows over an outer surface of the rotor blade, a boundary layer is formed over the outer surface that facilitates generating lift across the rotor blade.

At least some known wind turbine rotor blades include an active flow control system. Active Flow Control (AFC) is a general term for technologies and/or systems that actively attempt to influence an aerodynamic response of an object in reaction to given in-flow conditions. More specifically, at least some known AFC systems are used to manipulate the boundary layer across a wind turbine rotor blade. At least some known AFC systems use air supply systems to provide air to be discharged from the rotor blade and into the boundary layer. Known AFC systems require air to be channeled from the nacelle and/or the hub to the rotor blade. By channeling air from the nacelle and/or the hub, known AFC systems increase the energy requirements of wind turbine components, which results in a reduction in annual energy production of the wind turbine.

BRIEF DESCRIPTION OF THE INVENTION

In one aspect, an air distribution system for manipulating a boundary layer of air across a wind turbine rotor blade is provided. The wind turbine rotor blade includes at least one sidewall that defines a cavity therein. The sidewall extends between a leading edge and an axially-spaced trailing edge, and defines a chordwise axis between the leading edge and the trailing edge. The air distribution system includes a plurality of bleed flow assemblies that are positioned within the rotor blade and are configured to discharge air into the boundary layer to reduce a separation of the boundary layer from the rotor blade. Each bleed flow assembly of the plurality of bleed flow assemblies includes a bleed flow conduit that is coupled to an inner surface of the sidewall and is oriented with respect to the chordwise axis between the leading edge and the trailing edge. The bleed flow conduit is configured to channel air through the rotor blade. An inlet aperture is defined through the bleed flow conduit and through the sidewall to channel air into the bleed flow conduit. An outlet aperture is defined through the bleed flow conduit and through the sidewall to discharge air from the bleed flow conduit and into the boundary layer.

In another aspect, a wind turbine is provided. The wind turbine includes a tower, a nacelle that is coupled to the tower, a hub that is rotatably coupled to the nacelle, and at least one rotor blade that is coupled to the hub. The rotor blade includes at least one sidewall that has an inner surface that defines a cavity, and an outer surface that extends between a leading edge and an axially-spaced trailing edge. A plurality of bleed flow assemblies are positioned within the rotor blade for discharging air into a boundary layer of air across the outer surface to reduce a separation of the boundary layer from the outer surface. Each bleed flow assembly of the plurality of bleed flow assemblies includes a bleed flow conduit that is coupled to an inner surface of the sidewall and is oriented with respect to a chordwise axis that is defined between the leading edge and the trailing edge. The bleed flow conduit is configured to channel air through the rotor blade. An inlet aperture is defined through the bleed flow conduit and through the sidewall to channel air into the bleed flow conduit. An outlet aperture is defined through the bleed flow conduit and through the sidewall to discharge air from the bleed flow conduit and into the boundary layer.

In yet another aspect, a method of manipulating a boundary layer across a wind turbine rotor blade is provided. The rotor blade has at least one sidewall that defines a cavity therein. The sidewall extends between a leading edge and an axially-spaced trailing edge, and defines a chordwise axis between the leading edge and the trailing edge. The method includes coupling a bleed flow conduit to an inner surface of the sidewall, and orienting the bleed flow conduit with respect to the chordwise axis between the leading edge and the trailing edge. An inlet aperture is formed through the sidewall and through the bleed flow conduit to provide flow communication between ambient air and the bleed flow conduit. An outlet aperture is formed through the sidewall and through the bleed flow conduit to provide flow communication between the bleed flow conduit and the boundary layer. Air is channeled from the inlet aperture to the outlet aperture through the bleed flow conduit, and discharged from the bleed flow conduit into the boundary layer to prevent a separation of the boundary layer from the rotor blade.

BRIEF DESCRIPTION OF THE DRAWINGS

FIG. 6 is a flow chart illustrating an exemplary method of manipulating a boundary layer across the rotor blade shown in FIG. 2.

DETAILED DESCRIPTION OF THE INVENTION

The embodiments described herein facilitate assembling a rotor blade that increases an annual energy production of a wind turbine. As used herein, the term "annual energy production" refers to the cumulative electrical energy produced by a wind turbine during a period of a year. Moreover, the rotor blade described herein includes an air distribution system that discharges air into a boundary layer flowing across a rotor blade outer surface. More specifically, the air distribution system described herein is configured to draw ambient air into the rotor blade cavity and to discharge the air into the boundary layer. By discharging air into the boundary layer, the air distribution system facilitates increasing the aerodynamic efficiency of the rotor blade during operation of the wind turbine, and reduces the power requirements of wind turbine components as compared to known wind turbines. By drawing ambient air into the rotor blade cavity, and discharging air into the boundary layer, the air distribution system reduces a power requirement to manipulate the boundary layer to enable reattachment of the boundary layer and development of a laminar flow adjacent the rotor blade outer surface. As such, the embodiments described herein facilitate improving the operation of the wind turbine to increase the annual energy production of the wind turbine. In addition, the air distribution system channels air through the rotor blade cavity during a wind gust to reduce a lift of the rotor blade to prevent an overspeed of the wind turbine. By preventing an overspeed of the wind turbine, the cost of operating the wind turbine system is facilitated to be reduced. As used herein, the term "overspeed" refers to a rotational speed of a rotor shaft at which potential damage to the rotor shaft, including damage to the turbine, may occur.

Figure 1:
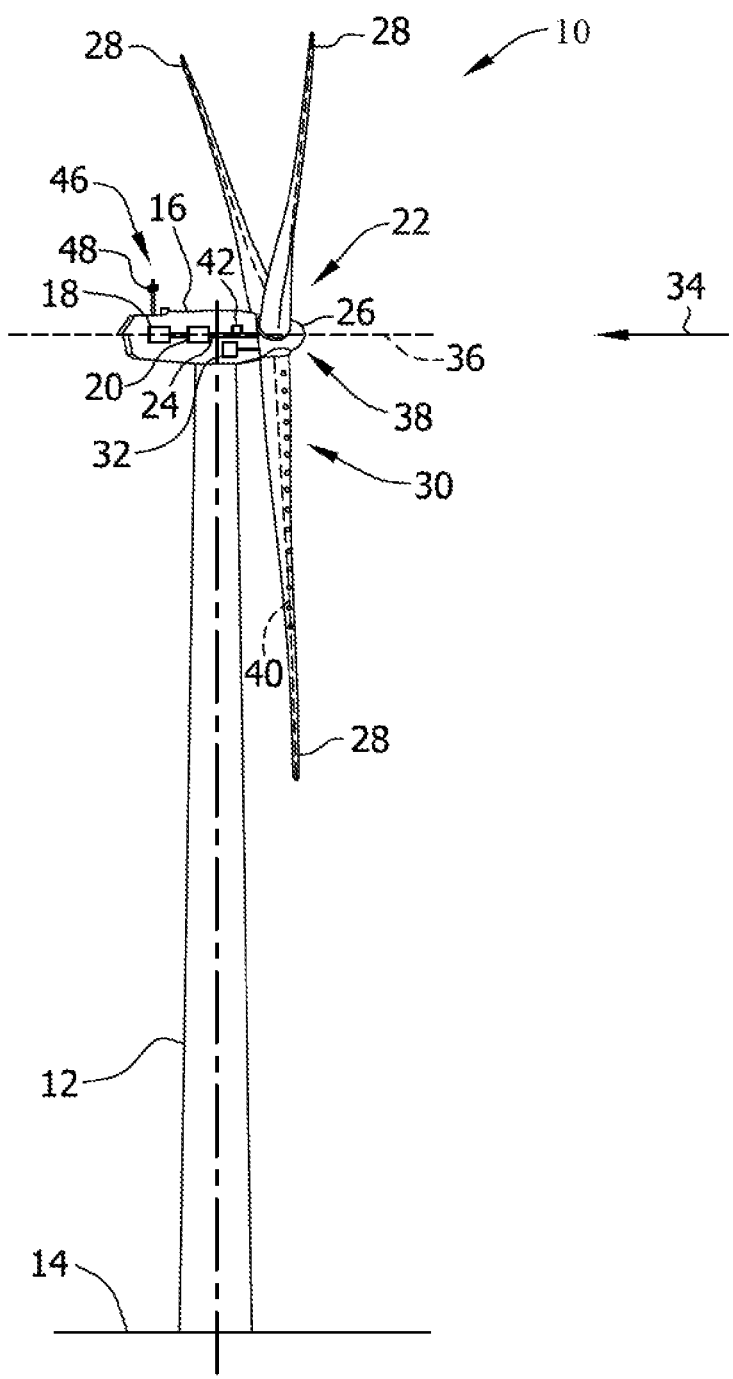
FIG. 1 is a perspective view of a portion of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 that is mounted on tower 12, a generator 18 that is positioned within nacelle 16, and a gearbox 20 that is coupled to generator 18. A rotor 22 is rotatably coupled to gearbox 20 with a rotor shaft 24. Alternatively, wind turbine 10 does not include gearbox 20 such that rotor 22 is rotatably coupled to generator 18 with rotor shaft 24. In the exemplary embodiment, rotor 22 includes a rotatable hub 26 and at least one rotor blade 28 that extends outwardly from hub 26. An air distribution system 30 is coupled to one or more rotor blades 28 to facilitate increasing energy production of wind turbine 10. In one embodiment, a control system 32 is coupled to air distribution system 30 and is in operational control communication with air distribution system 30. As used herein, "operational control communication" refers to a link, such as a conductor, a wire, and/or a data link, between two or more components of wind turbine 10 that enables signals, electric currents, and/or commands to be communicated between the two or more components. The link is configured to enable one component to control an operation of another component of wind turbine 10 using the communicated signals, electric currents, and/or commands.

In the exemplary embodiment, rotor 22 includes three rotor blades 28. In an alternative embodiment, rotor 22 includes more or less than three rotor blades 28. Rotor blades 28 are spaced about hub 26 to facilitate rotating rotor 22 to enable kinetic energy to be transferred from the wind into usable mechanical energy, and subsequently, electrical energy. In the exemplary embodiment, rotor blades 28 have a length ranging from about 30 meters (m) (99 feet (ft)) to about 120 m (394 ft). Alternatively, rotor blades 28 may have any suitable length that enables wind turbine 10 to function as described herein. For example, other non-limiting examples of blade lengths include 10 m or less, 20 m, and 37 m, or a length that is greater than 120 m. As wind strikes rotor blades 28 from a direction 34, rotor 22 is rotated about an axis of rotation 36. As rotor blades 28 are rotated and subjected to centrifugal forces, rotor blades 28 are also subjected to various forces and moments. As such, rotor blades 28 may deflect and/or rotate from a neutral, or non-deflected, position to a deflected position. A pitch adjustment system 38 rotates rotor blades 28 about a pitch axis 40 for adjusting an orientation of rotor blades 28 with respect to direction 34 and/or a velocity of the wind. A speed of rotation of rotor 22 may be controlled by adjusting the orientation of at least one rotor blade 28 relative to wind vectors. Wind turbine 10 includes at least one acceleration sensor 42 for transmitting a signal indicative of a speed of rotation of rotor 22 to control system 32. In the exemplary embodiment, an angle of attack or pitch of each rotor blade 28 is controlled individually by pitch adjustment system 38 to adjust a speed of rotation of rotor 22. As used herein, the term "angle of attack" refers to the orientation of a chordwise axis 44 (shown in FIG. 3) of rotor blade 28 relative to a wind direction 34 (shown in FIG. 3). Alternatively, the blade pitch for all rotor blades 28 may be controlled simultaneously by pitch adjustment system 38. Further, in the exemplary embodiment, nacelle 16 includes at least one meteorological mast 46 that includes a wind vane and a wind velocity sensor 48 such as, for example an anemometer. Sensor 48 is configured to sense a wind direction and/or a wind velocity of wind and transmit a signal indicative of wind direction 34 and/or the wind velocity to control system 32.

Figure 2:
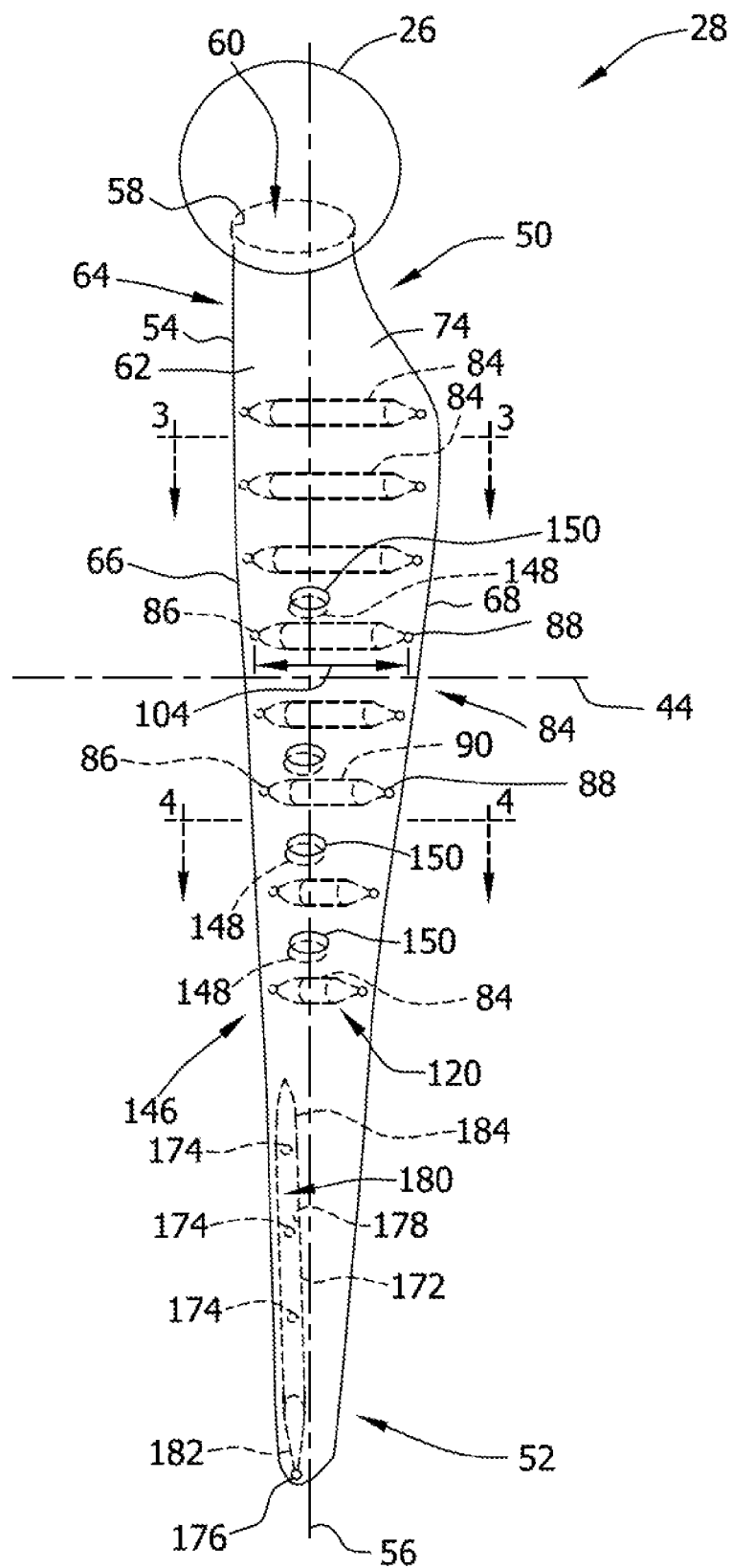
FIG. 2 is a perspective view of an exemplary rotor blade suitable for use with the wind turbine shown in FIG. 1 that includes an exemplary air distribution system.
Figure 3:
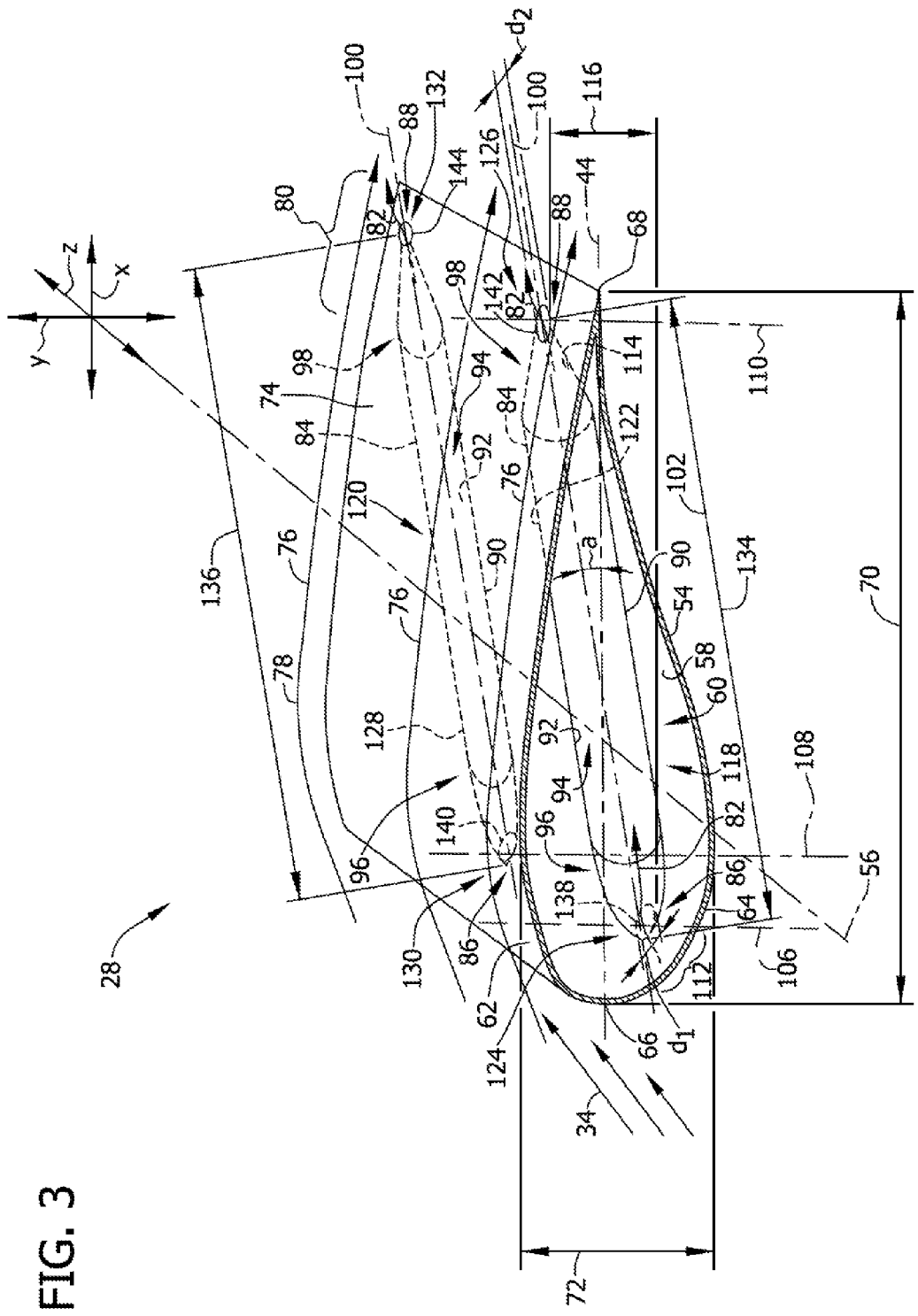
FIG. 3 is a cross-sectional view of the exemplary rotor blade including the air distribution system shown in FIG. 2 along sectional line 3-3.
Figure 4:
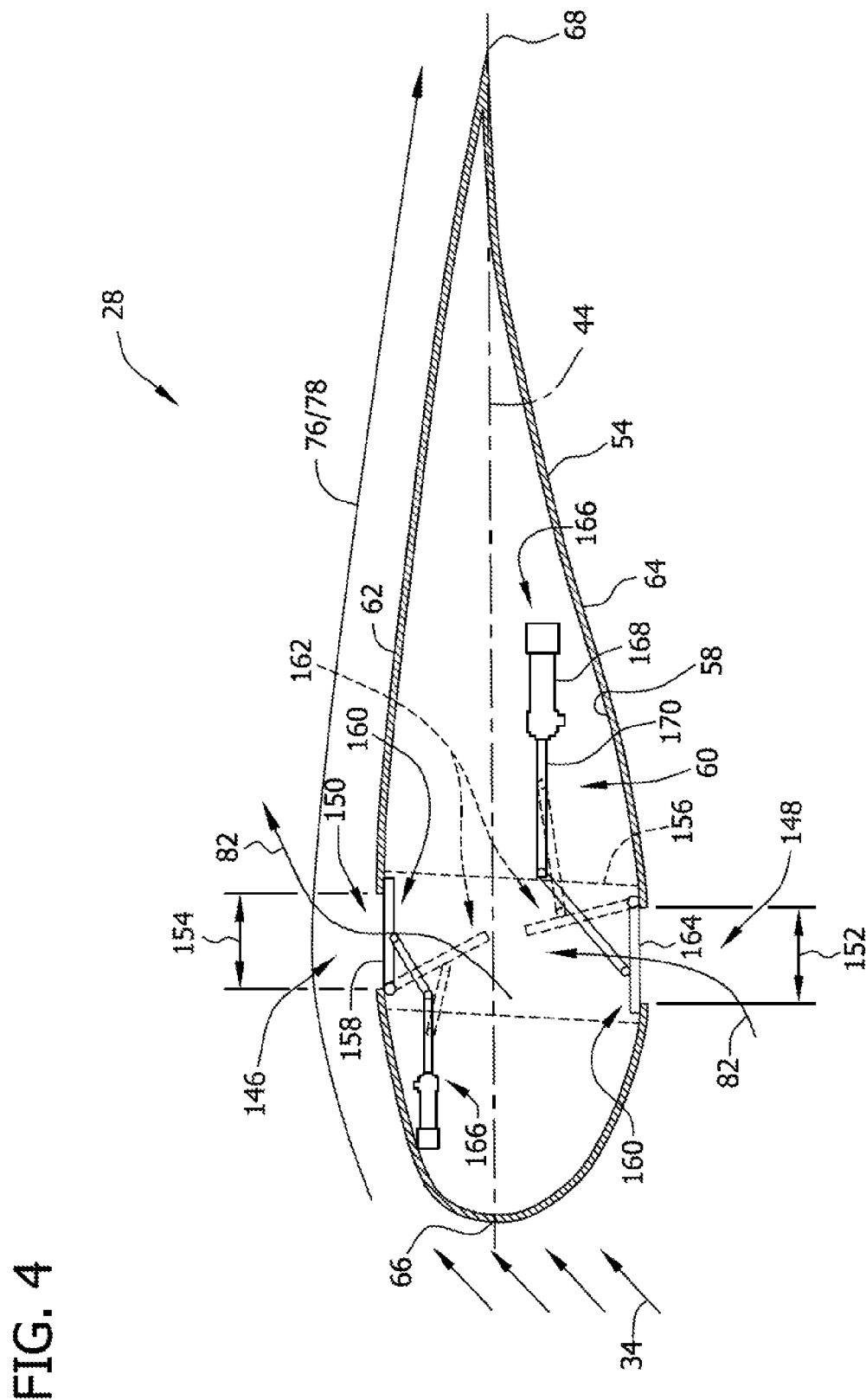
FIG. 4 is another cross-sectional view of the exemplary rotor blade including the air distribution system shown in FIG. 2 along sectional line 4-4.

FIG. 2 is a perspective view of an exemplary rotor blade 28. FIG. 3 is a cross-sectional view of rotor blade 28 at a chordwise sectional line 3-3 in FIG. 2. FIG. 4 is a cross-sectional view of rotor blade 28 at a chordwise sectional line 4-4 in FIG. 2. Identical components shown in FIG. 3 and FIG. 4 are identified with the same reference numbers used in FIG. 2. In the exemplary embodiment, rotor blade 28 includes a first portion, i.e. a root portion 50, and a second portion, i.e. a tip portion 52, opposing root portion 50. Root portion 50 is configured to facilitate mounting rotor blade 28 to hub 26. Rotor blade 28 includes at least one blade sidewall 54 that extends between root portion 50 and tip portion 52, and extends along a longitudinal spanwise axis 56 that is defined between root portion 50 and tip portion 52. Blade sidewall 54 has an inner surface 58 that at least partially defines a blade cavity 60 that extends from root portion 50 towards tip portion 52. Referring to FIG. 3, in the exemplary embodiment, blade sidewall 54 includes a first blade section, i.e. a suction side blade section 62, and an opposite second blade section, i.e. a pressure side blade section 64. Suction side blade section 62 is coupled to pressure side blade section 64 along a leading edge 66 and along an axially-spaced trailing edge 68 to form rotor blade 28. Rotor blade 28 has a chordwise width 70 extending along chordwise axis 44 that is defined between leading edge 66 and trailing edge 68.

In the exemplary embodiment, three perpendicular axes X, Y, and Z extend through rotor blade 28 to define a three-dimensional Cartesian coordinate system relative to rotor blade 28 such that the Z-axis is substantially coaxial with spanwise axis 56, and such that the X-axis is substantially coaxial with chordwise axis 44. In the exemplary embodiment, rotor blade 28 has a substantially airfoil shape and includes an airfoil thickness 72 defined along the Y-axis.

During operation of wind turbine 10, leading edge 66 of rotor blade 28 is oriented with respect to wind direction 34 such that wind is channeled over an outer surface 74 of rotor blade 28 from leading edge 66 towards trailing edge 68 and forms a boundary layer, represented by arrows 76, that extends between a boundary plane 78 and outer surface 74. As a velocity of wind increases across rotor blade 28, boundary layer 76 may separate from outer surface 74 and define a separation zone 80 along outer surface 74 at or near trailing edge 68. Air distribution system 30 is configured to discharge air, represented by arrows 82, into boundary layer 76 to facilitate manipulating boundary layer 76 to reduce and/or prevent a separation of boundary layer 76 from outer surface 74.

In the exemplary embodiment, air distribution system 30 includes a plurality of bleed flow assemblies 84 that are positioned within cavity 60. Each bleed flow assembly 84 is sized and shaped to discharge air 82 into boundary layer 76 to reduce a separation of boundary layer 76 from outer surface 74. Each bleed flow assembly 84 includes an inlet aperture 86, an outlet aperture 88, and a bleed flow conduit 90 that is coupled between inlet aperture 86 and outlet aperture 88. Bleed flow conduit 90 includes an inner surface 92 that defines a passage 94 that extends between a first end, i.e. and inlet end 96, and a second end, i.e. and outlet end 98, and defines a centerline axis 100 between inlet end 96 and outlet end 98. Passage 94 has an axial length 102 that is defined between inlet aperture 86 and outlet aperture 88. Passage 94 is sized and shaped to channel air from inlet aperture 86 to outlet aperture 88. In the exemplary embodiment, inlet aperture 86 includes a first diameter, i.e. an inlet diameter $d_1$, and outlet aperture 88 includes a second diameter, i.e. an outlet diameter $d_2$, that is smaller than inlet diameter $d_1$. Alternatively, outlet diameter $d_2$ may be equal to, or larger than, inlet diameter $d_1$.

In the exemplary embodiment, inlet aperture 86 extends through sidewall 54 and into inlet end 96 of bleed flow conduit 90 to provide flow communication between ambient air 82 and bleed flow conduit 90. Inlet aperture 86 is sized, shaped, and oriented to channel ambient air 82 into bleed flow conduit 90. Outlet aperture 88 extends through sidewall 54 and into outlet end 98 of bleed flow conduit 90 to provide flow communication between bleed flow conduit 90 and boundary layer 76. Outlet aperture 88 is positioned with respect to separation zone 80, and is sized, shaped, and oriented to discharge air from bleed flow conduit 90 into boundary layer 76 to manipulate boundary layer 76 to reduce separation of boundary layer 76 and increase a lift of rotor blade 28.

In the exemplary embodiment, outlet aperture 88 is spaced a distance 104 (shown in FIG. 2) from inlet aperture 86 along chordwise axis 44 such that bleed flow conduit 90 is oriented substantially parallel to chordwise axis 44 between leading edge 66 and trailing edge 68. In one embodiment, inlet aperture 86 is defined at a chordwise location 106 (shown in FIG. 3) along chordwise axis 44 that is between a chordwise location 108 (shown in FIG. 3) of maximum airfoil thickness of rotor blade 28 and leading edge 66. Alternatively, chordwise location 106 of inlet aperture 86 may be adjacent leading edge 66. In another alternative embodiment, outlet aperture 88 is defined at a chordwise location 110 between maximum chordwise airfoil thickness 108 and trailing edge 68. Alternatively, chordwise location 110 of outlet aperture 88 may be adjacent trailing edge 68.

In the exemplary embodiment, rotor blade 28 is sized and shaped such that during operation of wind turbine 10, boundary layer 76 is defined across suction side blade section 62. As wind impacts leading edge 66, a region 112 of high pressure air develops across pressure side blade section 64 proximate leading edge 66. In the exemplary embodiment, inlet aperture 86 is defined through pressure side blade section 64 and is configured to channel air from high pressure region 112 into bleed flow conduit 90. Inlet end 96 of bleed flow conduit 90 is sized and shaped to minimize a pressure loss through bleed flow conduit 90 as air is channeled from inlet aperture 86 to outlet aperture 88. Outlet end 98 has an inner surface 114 that converges towards outlet aperture 88 to facilitate forming a jet of air that is discharged through outlet aperture 88. Outlet aperture 88 is defined through suction side blade section 62 proximate separation zone 80, and is configured to discharge the jet or air into boundary layer 76. In one embodiment, inlet aperture 86 is spaced a distance 116 from outlet aperture 88 along the Y-axis such that bleed flow conduit 90 is oriented at an oblique angle α with respect to chordwise axis 44.

In the exemplary embodiment, air distribution system 30 includes a first bleed flow assembly 118 and at least a second bleed flow assembly 120. First bleed flow assembly 118 includes a first bleed flow conduit 122 that extends between a first inlet aperture 124 and a first outlet aperture 126. Second bleed flow assembly 120 includes a second bleed flow conduit 128 that extends between a second inlet aperture 130 and a second outlet aperture 132. In the exemplary embodiment, first bleed flow conduit 122 has a first axial length 134, and second bleed flow conduit 128 has a second axial length 136 that is different than first axial length 134. First inlet aperture 124 includes a first inlet diameter 138. Second inlet aperture 130 includes a second inlet diameter 140 that is different than first inlet diameter 138. First outlet aperture 126 includes a first outlet diameter 142, and second outlet aperture 132 includes a second outlet diameter 144 that is different than first outlet diameter 142. Alternatively, first inlet aperture 124 and second inlet aperture 130 include substantially equal inlet diameters $d_1$, and first outlet aperture 126 and second outlet aperture 132 include substantially equal outlet diameters $d_2$.

Referring to FIG. 2 and FIG. 4, in the exemplary embodiment, air distribution system 30 also includes a bypass flow assembly 146 to selectively channel air through rotor blade 28 to decrease a lift of rotor blade 28 and to reduce a speed of rotation of rotor 22. Bypass flow assembly 146 includes a plurality of bypass inlet openings 148 and a plurality of bypass outlet openings 150. Each bypass inlet opening 148 extends through pressure side blade section 64 to provide flow communication between rotor blade cavity 60 and ambient air 82, and is sized, shaped, and oriented to channel ambient air 82 into rotor blade cavity 60. Bypass inlet opening 148 includes a diameter 152 that is larger than inlet diameter $d_1$ (shown in FIG. 3) of inlet aperture 86. Each bypass outlet opening 150 extends through suction side blade section 62 to provide flow communication between rotor blade cavity 60 and boundary layer 76. Bypass outlet opening 150 is sized, shaped, and oriented to discharge air from rotor blade cavity 60 into boundary layer 76. Bypass outlet opening 150 includes a diameter 154 that is larger than outlet diameter $d_2$ (shown in FIG. 3) of outlet aperture 88. In one embodiment, bypass flow assembly 146 includes a plurality of bypass conduits 156 (shown in phantom lines in FIG. 4) that are positioned within rotor blade cavity 60. Each bypass conduit 156 is coupled between a bypass inlet opening 148 and a bypass outlet opening 150, respectively, for channeling air from bypass inlet opening 148 to bypass outlet opening 150.

In the exemplary embodiment, bypass flow assembly 146 includes a plurality of outlet hatches 158 that are removably coupled and/or pivotally coupled to suction side blade section 62. Each outlet hatch 158 is positioned with respect to a bypass outlet opening 150, respectively, and is configured to cover bypass outlet opening 150, as desired. Outlet hatch 158 is selectively positionable between a first position 160 and a second position 162 (shown in phantom lines in FIG. 4). In first position 160, outlet hatch 158 covers bypass outlet opening 150. In second position 162 outlet hatch 158 does not completely cover bypass outlet opening 150 and provides flow communication between rotor blade cavity 60 and boundary layer 76.

Bypass flow assembly 146 also includes a plurality of inlet hatches 164 that are removably coupled and/or pivotally coupled to pressure side blade section 64. Each inlet hatch 164 is positioned with respect to a bypass inlet opening 148, respectively, and is configured to cover bypass inlet opening 148, as desired. Inlet hatch 164 is selectively positionable between first position 160 and second position 162. In first position 160, inlet hatch 164 covers bypass outlet opening 150. In second position 162, inlet hatch 164 does not completely cover bypass inlet opening 148 and provides flow communication between ambient air 82 and rotor blade cavity 60.

In the exemplary embodiment, bypass flow assembly 146 includes a plurality of actuator assemblies 166 that are operatively coupled to each inlet hatch 164 and to each outlet hatch 158, respectively. Actuator assembly 166 is configured to selectively position inlet and outlet hatches 164 and 158 at first position 160, at second position 162, and any position between first position 160 and second position 162. Control system 32 is coupled in operative communication with each actuator assembly 166 for controlling an operation of actuator assembly 166, and moving actuator assembly 166 between first position 160 and second position 162. In the exemplary embodiment, each actuator assembly 166 is controlled individually by control system 32. Alternatively, each actuator assembly 166 may be controlled simultaneously by control system 32.

In the exemplary embodiment, actuator assembly 166 is positioned within rotor blade cavity 60 and is coupled to inner surface 58. In one embodiment, actuator assembly 166 is a hydraulic piston-type mechanism, and includes a hydraulic pump assembly (not shown), a hydraulic cylinder 168, and a hydraulic piston 170. The hydraulic pump assembly is coupled in flow communication with hydraulic cylinder 168 for adjusting a pressure of hydraulic fluid contained within hydraulic cylinder 168. Hydraulic piston 170 is positioned within hydraulic cylinder 168 and is configured to move with respect to hydraulic cylinder 168 based upon a hydraulic pressure within hydraulic cylinder 168. Hydraulic piston 170 is coupled to inlet and outlet hatches 164 and 158, respectively, to move inlet and outlet hatches 164 and 158 from first position 160 to second position 162, and from second position 162 to first position 160.

In an alternative embodiment, actuator assembly 166 includes a plurality of spring members (not shown) that are coupled to inlet hatch 164 and outlet hatch 158 respectively. Each spring member is configured to bias inlet and outlet hatches 164 and 158 to second position 162. During operation, as a wind gust strikes wind turbine 10, a differential air pressure across inlet and outlet hatches 164 and 158 increases. When the air pressure is greater than a predefined pressure, the air pressure overcomes the spring members and moves inlet and outlet hatches 164 and 158 from first position 160 to second position 162 such that air is channeled through rotor blade cavity 60.

Referring again to FIG. 2, in the exemplary embodiment, air distribution system 30 includes at least one discharge manifold 172 that is positioned within respective rotor blade cavity 60 and is coupled to inner surface 58. One or more intake apertures 174 extend through sidewall 54 and into discharge manifold 172 to provide flow communication between discharge manifold 172 and ambient air. One or more discharge apertures 176 extend through tip portion 52 of rotor blade 28 and into discharge manifold 172 to provide flow communication between discharge manifold 172 and ambient air adjacent tip portion 52. Discharge manifold 172 includes an inner surface 178 that defines a passage 180 that extends from a first end 182 to a second end 184 opposing first end 182. First end 182 is positioned within blade cavity 60 and is coupled to inner surface 58 adjacent tip portion 52. Second end 184 is positioned within blade cavity 68 and is closer to root portion 50 than first end 182 such that discharge manifold 172 extends along spanwise axis 56. Discharge aperture 176 extends through tip portion 52 and through first end 182. In one embodiment, intake aperture 174 has a shape that is substantially similar to inlet aperture 86, and discharge aperture 176 has a shape that is substantially similar to outlet aperture 88.

During rotation of rotor blade 28, in the exemplary embodiment, discharge manifold 172 channels air from intake aperture 174 into passage 180, and discharges air from passage 180 through discharge aperture 176 to facilitate reducing turbulence that generates noise at tip portion 52. Moreover, in one embodiment, discharge manifold 172 discharges air to modify the vortices that trail from tip portion 52, thereby facilitating reduced levels of vortex turbulent kinetic energy (TKE) and reduced vortex wash that causes separation of boundary layer 76 from blade tip portion 52. Reducing TKE facilitates reducing pressure fluctuations that generate noise. Reducing vortex wash facilitates reducing high efficiency source noise mechanisms and facilitates diffusing and scattering acoustic waves to prevent coherent noise radiation produced by flat surfaces.

Figure 5:
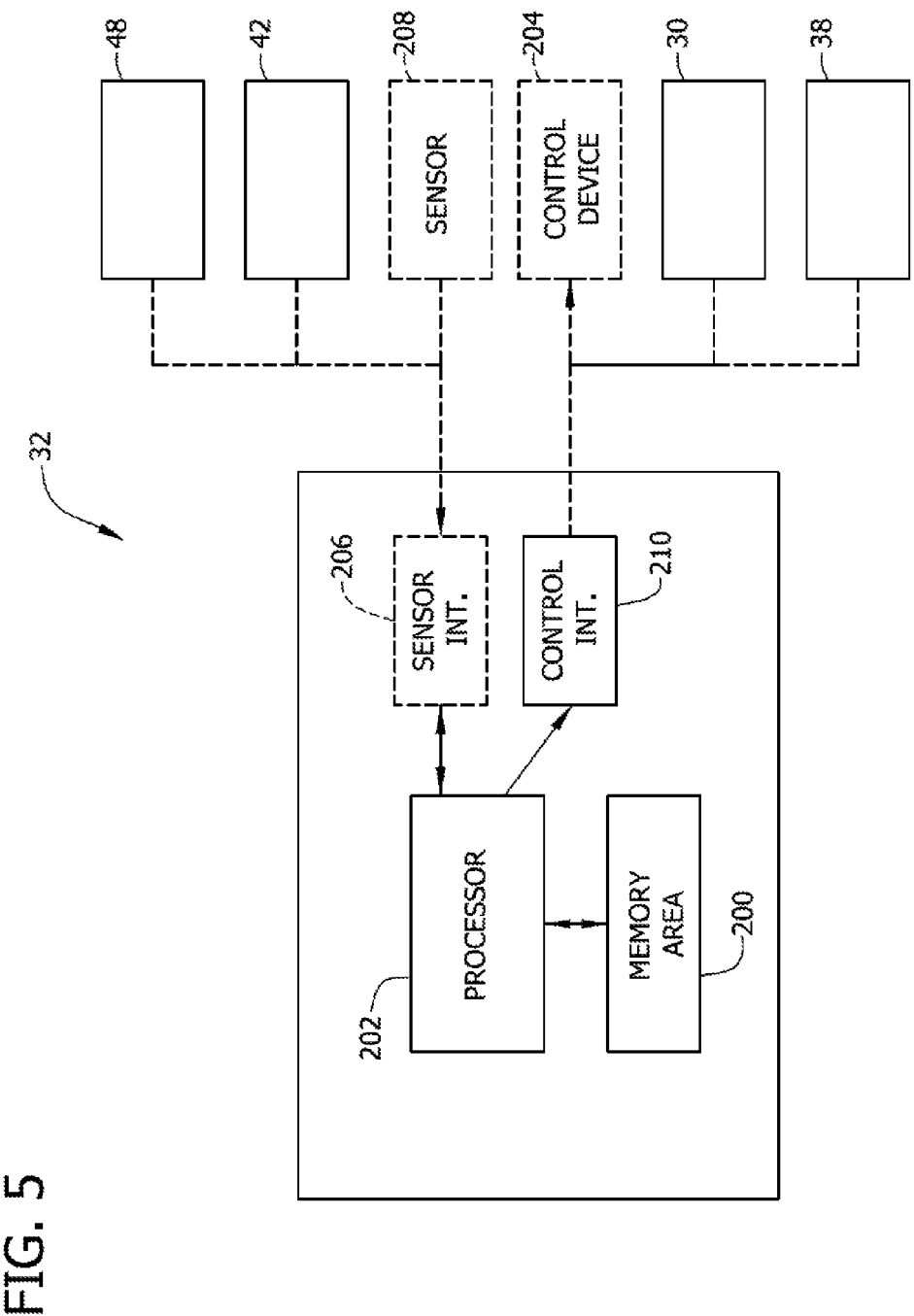
FIG. 5 is a block diagram of an exemplary control system suitable for use with the wind turbine shown in FIG. 1.

FIG. 5 is a block diagram illustrating an exemplary control system 32. In the exemplary embodiment, control system 32 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, control system 32 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, control system 32 includes a memory area 200 configured to store executable instructions and/or one or more operating parameters representing and/or indicating an operating condition of wind turbine 10. Operating parameters may represent and/or indicate, without limitation, a speed of rotation, a pitch angle, a wind speed, and/or a wind direction. Control system 32 further includes a processor 202 that is coupled to memory area 200 and is programmed to determine an operation of one or more wind turbine control devices 204, for example, air distribution system 30 and pitch adjustment system 38, based at least in part on one or more operating parameters. In one embodiment, processor 202 may include a processing unit, such as, without limitation, an integrated circuit (IC), an application specific integrated circuit (ASIC), a microcomputer, a programmable logic controller (PLC), and/or any other programmable circuit. Alternatively, processor 202 may include multiple processing units (e.g., in a multi-core configuration).

In the exemplary embodiment, control system 32 includes a sensor interface 206 that is coupled to at least one sensor 208 such as, for example, velocity sensor 48 and acceleration sensor 42 for receiving one or more signals from sensor 208. Each sensor 208 generates and transmits a signal corresponding to an operating parameter of wind turbine 10. Moreover, each sensor 208 may transmit a signal continuously, periodically, or only once, for example, though other signal timings are also contemplated. Furthermore, each sensor 208 may transmit a signal either in an analog form or in a digital form. Control system 32 processes the signal(s) by processor 202 to create one or more operating parameters. In some embodiments, processor 202 is programmed (e.g., with executable instructions in memory area 200) to sample a signal produced by sensor 208. For example, processor 202 may receive a continuous signal from sensor 208 and, in response, periodically (e.g., once every five seconds) calculate an operation mode of air distribution system 30 based on the continuous signal. In some embodiments, processor 202 normalizes a signal received from sensor 208. For example, sensor 208 may produce an analog signal with a parameter (e.g., voltage) that is directly proportional to an operating parameter value. Processor 202 may be programmed to convert the analog signal to the operating parameter. In one embodiment, sensor interface 206 includes an analog-to-digital converter that converts an analog voltage signal generated by sensor 208 to a multi-bit digital signal usable by control system 32.

Control system 32 also includes a control interface 210 that is configured to control an operation of air distribution system 30. In some embodiments, control interface 210 is operatively coupled to one or more wind turbine control devices 204, for example, bypass flow assembly 146 (shown in FIG. 4).

Various connections are available between control interface 210 and control device 204, and between sensor interface 206 and sensor 208. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 10) network connection, whether wired or wireless.

During operation of wind turbine 10, a sudden gust of wind may dramatically increase wind speed within a relatively small interval of time. During such sudden gusts, control system 32 operates bypass flow assembly 146 to channel air through rotor blade 28 to reduce a lift across rotor blade 28 to facilitate preventing an overspeed of rotor shaft 24 which may increase loading on wind turbine 10 and cause damage to wind turbine components. In the exemplary embodiment, control system 32 receives from sensor 48 signals indicative of a velocity of wind. Control system 32 is configured to calculate a wind speed based on the received signal. Control system 32 is also configured to compare the calculated wind speed with a predefined wind speed and to operate bypass flow assembly 146 to decrease a lift of rotor blade 28 when the calculated wind speed is greater than the predefined wind speed. Upon determining that a sensed wind speed is greater than a predefined wind speed, control system 32 moves inlet and outlet hatches 164 and 158 from first position 160 to second position 162 to enable air to be channeled from bypass inlet opening 148 to bypass outlet opening 150 through rotor blade cavity 60. Upon determining that a sensed wind velocity is equal to or less than the predefined wind velocity, control system 32 moves inlet and outlet hatches 164 and 158 from second position 162 to first position 160 to prevent air from entering rotor blade cavity 60 through bypass outlet opening 150 and through bypass inlet opening 148.

FIG. 6 is a flow chart illustrating an exemplary method 300 of manipulating boundary layer 76 across rotor blade 28. In the exemplary embodiment, method 300 includes coupling 302 bleed flow conduit 90 to inner surface 58 of rotor blade sidewall 54 and orienting bleed flow conduit 90 with respect to chordwise axis 44 between leading edge 66 and trailing edge 68. Inlet aperture 86 is formed 304 through sidewall 54 and through bleed flow conduit 90 to provide flow communication between ambient air 82 and bleed flow conduit 90. Outlet aperture 88 is formed 306 through sidewall 54 and through bleed flow conduit 90 to provide flow communication between bleed flow conduit 90 and boundary layer 76. Air is channeled 308 from inlet aperture 86 to outlet aperture 88 through bleed flow conduit 90 and discharged from bleed flow conduit 90 into boundary layer 76 to prevent a separation of boundary layer 76 from rotor blade 28. In one embodiment, method 300 includes forming 310 outlet aperture 88 through suction side blade section 62 proximate trailing edge 68. Inlet aperture 86 is formed 312 through pressure side blade section 64 proximate leading edge 66.

In an alternative embodiment, method 300 includes coupling 314 bypass flow assembly 146 to rotor blade 28. A signal indicative of a wind velocity is transmitted 316, from sensor 48 to control system 32. Control system 32 operates 318 bypass flow assembly 146 to channel air from rotor blade cavity 60 and into boundary layer 76 based on the sensed wind velocity.

An exemplary technical effect of the system, method, and apparatus described herein includes at least one of: (a) transmitting, from a sensor to a control system, a signal indicative of a velocity of wind; (b) calculating, by the control system, a wind speed based on the first signal; (c) comparing the calculated wind speed to a predefined wind speed; and (d) operating a bypass flow assembly when the calculated wind speed is different than the predefined wind speed.

The above-described system, method, and apparatus facilitate manipulating a boundary layer across a rotor blade of a wind turbine to increase an aerodynamic efficiency of the rotor blade during operation of the wind turbine. More specifically, the air distribution system is configured to draw ambient air into the rotor blade cavity and to discharge the air into the boundary layer. By discharging air into the boundary layer, the air distribution system facilitates increasing the aerodynamic efficiency of the rotor blade during operation of the wind turbine, and reduces the power requirements of wind turbine components as compared to known wind turbines. In addition, the air distribution system channels air through the rotor blade cavity during a wind gust to reduce a lift of the rotor blade to prevent an overspeed of the wind turbine. As such, the embodiments described herein facilitate improving the operation of the wind turbine to increase the annual energy production of the wind turbine.

Exemplary embodiments of systems and methods for manipulating a boundary layer are described above in detail. The systems and methods are not limited to the specific embodiments described herein, but rather, components of the systems and/or steps of the methods may be utilized independently and separately from other components and/or steps described herein. For example, the methods may also be used in combination with other active flow control systems, and are not limited to practice with only the wind turbine systems as described herein. Rather, the exemplary embodiment can be implemented and utilized in connection with many other blade lift enhancement applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An air distribution system for manipulating a boundary layer of air across a wind turbine rotor blade, the wind turbine rotor blade having at least one sidewall defining a cavity therein, the sidewall extending between a leading edge and an axially spaced trailing edge and defining a chordwise axis between the leading edge and the trailing edge, said air distribution system comprising:
   at least one bleed flow assembly positioned within the cavity and configured to discharge air into the boundary layer to reduce a separation of the boundary layer from the rotor blade, each bleed flow assembly comprising:
   a bleed flow conduit coupled to an inner surface of the sidewall and oriented with respect to the chordwise axis between the leading edge and the trailing edge, said bleed flow conduit configured to channel air through the rotor blade;
   an inlet aperture extending through the sidewall proximate the leading edge to channel air into said bleed flow conduit; and
   an outlet aperture extending through the sidewall proximate the trailing edge to discharge air from said bleed flow conduit and into the boundary layer, and
   at least one bypass flow assembly positioned within the cavity, each bypass flow assemble comprising:
   a bypass inlet opening extending through the sidewall to channel ambient air into the rotor blade cavity;
   a bypass outlet opening extending through the blade sidewall to discharge air from the rotor blade cavity into the boundary layer;
   an inlet hatch coupled to the sidewall and positioned with respect to the bypass inlet opening, the inlet hatch movable to cover said bypass inlet opening in a first position and to allow air to be channeled into the rotor blade cavity in a second position; and
   an outlet hatch coupled to the blade sidewall and positioned with respect to the bypass outlet opening, the outlet hatch movable to cover the bypass outlet opening in a first position and to allow air to be discharged from the rotor blade cavity in a second position.

2. An air distribution system in accordance with claim 1, wherein the blade sidewall includes a first blade section and an opposite second blade section coupled to the first blade section to form the rotor blade, said outlet aperture defined through the first blade section proximate the trailing edge, said inlet aperture defined through the second blade section proximate the leading edge.

3. An air distribution system in accordance with claim 1, wherein said bypass flow assembly further comprises:
   a plurality of actuators, each actuator operatively coupled to a respective inlet hatch to position said inlet hatch at said first position, at said second position, and at any position therebetween; and
   a control system operatively coupled to said inlet hatch to facilitate moving said inlet hatch at said first position, at said second position, and at any position therebetween.

4. An air distribution system in accordance with claim 1, wherein the wind turbine rotor blade has a thickness defined perpendicularly from the chordwise axis, said outlet aperture positioned between the trailing edge and a location of maximum thickness of the wind turbine rotor blade with respect to the chordwise axis.

5. An air distribution system in accordance with claim 4, wherein said inlet aperture is positioned between the leading edge and the location of maximum thickness with respect to the chordwise axis.

6. An air distribution system in accordance with claim 1, wherein the rotor blade extends between a root portion and a tip portion, said air distribution system further comprises:
   at least one intake aperture defined through the sidewall;
   at least one discharge aperture defined through the sidewall and positioned adjacent the tip portion; and
   a discharge manifold coupled between said intake aperture and said discharge aperture for discharging air through the tip portion of the rotor blade.

7. A wind turbine, comprising:
   a tower;
   a nacelle coupled to said tower;
   a hub rotatably coupled to said nacelle;
   at least one rotor blade coupled to said hub, said rotor blade comprising at least one sidewall having an inner surface defining a cavity and an outer surface extending between a leading edge and an axially spaced trailing edge; and
   at least one bleed flow assembly positioned within said cavity for discharging air into a boundary layer of air across said outer surface to reduce a separation of the boundary layer from said outer surface, each bleed flow assembly comprising:
   a bleed flow conduit coupled to an inner surface of said sidewall and oriented with respect to a chordwise axis defined between said leading edge and said trailing edge, said bleed flow conduit configured to channel air through said rotor blade;
   an inlet aperture extending through said sidewall proximate the leading edge to channel air into said bleed flow conduit; and
   an outlet aperture extending through said sidewall proximate the trailing edge to discharge air from said bleed flow conduit and into the boundary layer; and
   at least one bypass flow assembly positioned within the cavity, each bypass flow assembly comprising: a bypass inlet opening extending through the sidewall to channel ambient air into the rotor blade cavity;
   a bypass outlet opening extending through the blade sidewall to discharge air from the rotor blade cavity into the boundary layer;
   an inlet hatch coupled to the sidewall and positioned with respect to the bypass inlet opening, the inlet hatch movable to cover said bypass inlet opening in a first position and to allow air to be channeled into the rotor blade cavity in a second position; and
   an outlet hatch coupled to the blade sidewall and positioned with respect to the bypass outlet opening, the outlet hatch movable to cover the bypass outlet opening in a first position and to allow air to be discharged from the rotor blade cavity in a second position.

8. A wind turbine in accordance with claim 7, wherein said sidewall includes a first blade section and an opposite second blade section coupled to said first blade section to form said rotor blade, said outlet aperture defined through said first blade section proximate said trailing edge, said inlet aperture defined through said second blade section proximate said leading edge.

9. A wind turbine in accordance with claim 7, wherein said bypass flow assembly further comprises:
   a plurality of actuators, each actuator operatively coupled to a respective inlet hatch to position said inlet hatch at said first position, at said second position, and at any position therebetween; and a control system operatively coupled to said inlet hatch to facilitate moving said inlet hatch at said first position, at said second position, and at any position therebetween.

10. A wind turbine in accordance with claim 7, wherein said rotor blade has a thickness defined perpendicularly from the chordwise axis, said outlet aperture positioned between said trailing edge and a location of maximum thickness of said rotor blade with respect to the chordwise axis.

11. A wind turbine in accordance with claim 10, wherein said inlet aperture is positioned between said leading edge and the location of maximum thickness with respect to the chordwise axis.

12. A wind turbine in accordance with claim 7, wherein said rotor blade extends between a root portion and a tip portion, said air distribution system further comprises:
   at least one intake aperture defined through said sidewall;
   at least one discharge aperture defined through said sidewall and positioned adjacent said tip portion; and
   a discharge manifold coupled between said intake aperture and said discharge aperture for discharging air through said tip portion of said rotor blade.

13. A method of manipulating a boundary layer across a wind turbine rotor blade, the rotor blade having at least one sidewall defining a cavity therein, the sidewall extending between a leading edge and an axially spaced trailing edge and defining a chordwise axis between the leading edge and the trailing edge, said method comprising:
   coupling a bleed flow conduit to an inner surface of the sidewall and orienting the bleed flow conduit with respect to the chordwise axis between the leading edge and the trailing edge;
   forming an inlet aperture through the sidewall and through the bleed flow conduit to provide flow communication between ambient air and the bleed flow conduit;
   forming an outlet aperture through the sidewall and through the bleed flow conduit to provide flow communication between the bleed flow conduit and the boundary layer;
   channeling air from the inlet aperture to the outlet aperture through the bleed flow conduit, and discharging the air from the bleed flow conduit into the boundary layer to prevent a separation of the boundary layer from the rotor blade;
   coupling a bypass flow assembly to the rotor blade;
   transmitting, from a sensor to a control system, a signal indicative of a wind velocity; and
   operating the bypass flow assembly to channel air from the rotor blade cavity and into the boundary layer based on the sensed wind velocity.

14. A method in accordance with claim 13, wherein the blade sidewall includes a first blade section and an opposite second blade section coupled to the first blade section to form the rotor blade, said method further comprising:
   forming the outlet aperture through the first blade section proximate the trailing edge; and
   forming the inlet aperture through the second blade section proximate the leading edge.

15. A method in accordance with claim 13, wherein coupling a bypass flow assembly to the rotor blade comprises:
   forming a plurality of bypass inlet openings through the second blade section to channel ambient air into the rotor blade cavity;
   forming a plurality of bypass outlet openings through the first blade section to discharge air from said rotor blade cavity into the boundary layer; and
   coupling a plurality of outlet hatches to the first blade section adjacent a respective bypass outlet opening, each outlet hatch movable to cover the respective bypass outlet opening in a first position and to allow air to be discharged from said rotor blade cavity in a second position.

* * * * *